United States Patent
Kiermaier et al.

(10) Patent No.: US 11,607,993 B2
(45) Date of Patent: Mar. 21, 2023

(54) VEHICLE INTERIOR LIGHTING APPARATUS

(71) Applicant: LISA DRAXLMAIER GMBH, Vilsbiburg (DE)

(72) Inventors: Josef Kiermaier, Unterdietfurt (DE); Alexandr Zaviyalov, Landshut (DE)

(73) Assignee: LISA DRÄXLMAIER GMBH, Vilsbiburg (DE)

( * ) Notice: Subject to any disclaimer, the term of this patent is extended or adjusted under 35 U.S.C. 154(b) by 0 days.

(21) Appl. No.: 17/431,165

(22) PCT Filed: Feb. 11, 2020

(86) PCT No.: PCT/EP2020/053470
§ 371 (c)(1),
(2) Date: Aug. 15, 2021

(87) PCT Pub. No.: WO2020/165168
PCT Pub. Date: Aug. 20, 2020

(65) Prior Publication Data
US 2022/0134948 A1 May 5, 2022

(30) Foreign Application Priority Data
Feb. 15, 2019 (DE) ...................... 10 2019 103 855.3

(51) Int. Cl.
*B60Q 3/64* (2017.01)
*B60Q 3/217* (2017.01)
(Continued)

(52) U.S. Cl.
CPC ................ *B60Q 3/64* (2017.02); *B60Q 3/20* (2017.02); *B60Q 3/217* (2017.02); *B60Q 3/62* (2017.02); *G02B 6/001* (2013.01)

(58) Field of Classification Search
CPC . B60Q 3/64; B60Q 3/217; B60Q 3/62; B60Q 3/20; G02B 6/001
(Continued)

(56) References Cited

U.S. PATENT DOCUMENTS 3,532,871 A * 10/1970 Shipman ................. F21S 43/40
359/548
6,185,357 B1 2/2001 Zou et al.
(Continued)

FOREIGN PATENT DOCUMENTS

DE 699 22 224 T2 3/2000
DE 10 2009 058 458 A1 7/2011
(Continued)

OTHER PUBLICATIONS

English Abstract for EP 2 980 469.
(Continued)

*Primary Examiner* — Laura K Tso
(74) *Attorney, Agent, or Firm* — Jacob Eisenberg

(57) ABSTRACT

A vehicle interior lighting apparatus is disclosed. It includes an elongate light guide having at least one end-side light input coupling surface, a longitudinal light deflection surface and a longitudinal light output coupling surface opposite the light deflection surface, and at least one light source, the light of which is able to be coupled into the light guide at the at least one light input coupling surface and able to be coupled out of the light guide at the light output coupling surface by way of a light deflection at the light deflection surface. At least one light deflection prism is disposed optically downstream of the light output coupling surface and there is at least one jump between two refractive indices in a light path between the light guide and the at least one light deflection prism and the at least one light deflection prism is disposed between two adjacent light deflection
(Continued)

regions when viewed perpendicular to the light output coupling surface. A vehicle has at least one vehicle interior lighting apparatus. An application for the disclosed apparatus includes door lighting.

12 Claims, 4 Drawing Sheets

(51) Int. Cl.
    *F21V 8/00*     (2006.01)
    *B60Q 3/62*     (2017.01)
    *B60Q 3/20*     (2017.01)

(58) Field of Classification Search
    USPC ................................ 362/511, 501, 488, 493
    See application file for complete search history.

(56) References Cited

U.S. PATENT DOCUMENTS

| | | | |
|---|---|---|---|
| 7,437,050 B2* | 10/2008 | Bourdin | ................ F21S 43/247 362/331 |
| 2005/0135116 A1 | 6/2005 | Epstein et al. | |
| 2009/0052205 A1* | 2/2009 | Chen | .................... H04N 1/1017 362/615 |
| 2014/0140091 A1 | 5/2014 | Vasylyev | |
| 2015/0268399 A1 | 9/2015 | Futterer | |
| 2015/0316227 A1* | 11/2015 | Sahlin | .................. G02B 6/0076 362/511 |
| 2015/0370001 A1 | 12/2015 | Morozov et al. | |
| 2016/0116663 A1 | 4/2016 | Hong et al. | |
| 2017/0176665 A1 | 6/2017 | Kim | |

FOREIGN PATENT DOCUMENTS

| | | |
|---|---|---|
| EP | 2 980 469 | 2/2016 |
| WO | WO 2018/144720 | 8/2018 |

OTHER PUBLICATIONS

English Abstract for DE 10 2009 058 458 A1.
International Search Report for PCT/EP2020/053470.
English Translation of International Search Report for PCT/EP2020/053470.
First Office Action from the German Patent and Trademark Office for DE 10 2019 103 855.3.
Second Office Action from the German Patent and Trademark Office for DE 10 2019 103 855.3.
English Translation of First Office Action from the German Patent and Trademark Office for DE 10 2019 103 855.3.
English Translation of Second Office Action from the German Patent and Trademark Office for DE 10 2019 103 855.3.

* cited by examiner

VEHICLE INTERIOR LIGHTING APPARATUS

CROSS REFERENCE TO RELATED APPLICATIONS

This application is a national phase application of International Application No. PCT/EP2020/053470, filed on 11 Feb. 2020, and claims the priority benefit of German Application 102019103855.3, filed on 15 Feb. 2019, the content of both of which is incorporated herein by reference.

BACKGROUND OF THE PRESENT DISCLOSURE

The present disclosure relates to a vehicle interior lighting device, comprising an elongated light guide having at least one front-side light coupling surface, a longitudinal light deflection surface and a longitudinal light decoupling surface opposite the light deflection surface and at least one light source, whose light can be coupled into the light guide at the at least one light coupling surface and can be decoupled from the light guide by means of light deflection at the light deflection surface at the light output coupling surface. The present disclosure also relates to a vehicle having at least one such vehicle interior lighting apparatus. The vehicle interior lighting apparatus is particularly advantageously applicable for door lighting.

EP 2 500 753 A1 discloses a light guide which has a light volume conducting along a main propagation direction and which has at least one decoupling element having a boundary surface, the light is deflected by an internal total reflection at its boundary surface at an angle to a light outlet surface under which it exits the light guide. The light guide is characterized in that the decoupling element protrudes from one side of the light conducting volume transversely to the main propagation direction and in that the light exit surface forms part of the interface of the decoupling element.

DE 10 2009 012 224 A1 discloses a lighting device which is suitable for use in the automotive lighting area, it comprises a main light guide, which is suitable for conducting light within the light guide with total reflection of the light and a plurality of light-conducting, light decoupling elements which are arranged in the light guide. The light decoupling elements comprise a solid body having a light guide. A light passage surface is provided at a point at which the element that couples out the light is coupled to the main light guide, wherein a path for light beams that occur as a result of total reflection directly on the light passage surface, which runs from within the light guide via the light passage surface through the light outlet surface to an outside of the light guide device. A light passing surface is provided at a point at which the decoupling element is coupled to the main light guide, wherein a path for light rays that directly incident light on the light passing surface due to total reflection is provided, which runs from within the light guide via the light passing surface through the light outlet surface to an outside of the light guide device. The present disclosure further relates to a motor vehicle lighting apparatus which contains a light source which is connected to a light guide in order to couple light into the main light guide.

EP 3 210 827 A1 discloses a lamp for a motor vehicle having at least one illuminant and to a planar light guide having at least one light input coupling surface and at least one light output coupling surface which is provided at a distance therefrom on a first flat side of the light guide, wherein on a second flat side of the light guide, which are arranged opposite the light output coupling surface, decoupling elements on which light beams guided in the planar light guide are deflected to the light output coupling surface such that they exit from the planar light guide, wherein the illuminant interacts with a rod-shaped light guide and the light of the illuminant enters into the rod-shaped light guide on a light entry surface of the rod-shaped light guide and leaves it again via a light coupling surface provided on the peripheral surface in order to be coupled into the light input coupling surface of the flat light guide.

US 2018/0118104 A1 discloses a light guide for a lighting module, in particular for a motor vehicle. The light guide is used to guide light from a light source located therein. The light guide comprises a curved inlet region which is optically coupled to the light source in order to introduce light into the light guide. An outlet section is optically coupled to the inlet section and is designed to radiate all or part of the light coupled into the light guide. The inlet section has an optical element which is configured to emit part of the light which enters the inlet section.

EP 0 191 264 A2 discloses a device for glare control of large-area illuminants for indoor and outdoor lighting. Using prisms, triangular prisms are arranged vertically with one of their lateral faces and horizontally with the other lateral face, the lateral faces forming an angle of 90° and the horizontal lateral face having the base face forming a wedge angle of 35° to 45°, preferably 40°.

BRIEF SUMMARY OF THE INVENTION

An aim of the present disclosure is therefore to provide an improved possibility for targeted illumination of certain partial areas of a vehicle interior using means that are as simple as possible in terms of design.

The task is solved by the subject-matter of the independent claims. Advantageous embodiments of the present disclosure are given in the dependent claims, the description, and the accompanying figures.

A vehicle interior lighting device according to the present disclosure has an elongated light guide having at least one front-side light input coupling surface, a longitudinal light deflection surface and a longitudinal light output coupling surface opposite the light deflection surface and at least one light source, whose light can be coupled into the light guide at the at least one light output coupling surface and can be decoupled from the light guide by means of light deflection on the light deflection surface on the light coupling surface, wherein at least one light deflection prism is optically connected downstream of the light decoupling surface and at least one jump between two refraction indices occurs in a light path between the light guide and the at least one light deflection prism. A plurality of light deflection regions, which are spaced apart from one another in the longitudinal direction of the light guide, are provided on the light output coupling surface. Furthermore, the at least one light deflection prism is arranged between two adjacent light deflection regions when viewed perpendicular to the light output coupling surface.

The at least one light deflection prism has the advantage of providing the light incident thereon from the light deflection surface, which is otherwise present next to a desired target area of a vehicle interior (for example, next to an inner side of a vehicle door) can be redirected to the target area. This improves the light output in the target area. It is also possible to largely avoid disturbing scattered being emitted from otherwise undesirably illuminated areas of the vehicle interior (such as pillars). By jumping between two refractive indices, a particularly effective beam deflection is achieved, in particular in comparison to a single-component prism integrated into the light guide in one piece. Another advantage is that the lighting apparatus can be arranged in such a way that the at least one light deflection prism is also visible in the switched-off or non-illuminated state and then has a novel, high-quality appearance.

By means of the plurality of light deflection regions, a targeted decoupling of light from the light guide along the longitudinal direction thereof can be advantageously achieved in a fundamentally known manner.

When viewed, the at least one light deflection prism is arranged perpendicular to the light output coupling surface between two adjacent light deflection regions, results in the advantage that the at least one light deflection prism, which exits from the light guide at a flat angle, either deflects unwanted light back into the light guide by total reflection or deflects it into a useful light area by total reflection and refraction, which results in an increase in efficiency. The useful light emerging from the light guide at a steep angle, on the other hand, advantageously passes the at least one light deflection prism and is not impaired by it, for example, not attenuated.

When viewed, the at least one light deflection prism is arranged perpendicular to the light output coupling surface between two adjacent light deflection regions, may comprise that the at least one light deflection prism or the surface occupied by it is arranged disjunctively with respect to the light deflection regions or the surfaces occupied therewith or that these surfaces do not cover or overlap. Alternatively, the at least one light deflection prism may partially cover or overlap one or both light deflection regions when viewed perpendicular to the light deflection surface, but not completely. The present disclosure is characterized in that the at least one light deflection prism covers a respective light deflection region in terms of area and/or in the longitudinal direction not more than 50%, in particular does not cover more than 25%, in particular does not cover more than 10%. The at least one light deflection prism does not completely or only partially cover the associated adjacent light deflection regions when viewed perpendicular to the light output coupling surface of the light guide.

The vehicle interior lighting apparatus is a lighting apparatus which is provided to illuminate at least one partial region of a vehicle interior.

An elongated light guide is in particular a light guide whose length is noticeably greater than its height and/or width. Its end-side sides with respect to the longitudinal direction or extension are referred to as end faces or front faces. At least one of the end faces is intended to provide a light input coupling surface such that light is coupled there through into the light guide. Light may generally be coupled into one or both of the end faces.

In particular, the length of the light guide is greater than its width by at least one order of magnitude, that is, by at least a factor of 10. However, this size ratio between length and width is not limited thereto and may, for example, also be in the range of at least one factor 2, at least one factor 5 and so on.

A side of the light guide which extends along its longitudinal direction, in particular between the two end faces, may also be called the longitudinal side. The light deflecting surface and the light decoupling surface correspond to opposite longitudinal sides or shorter partial regions thereof.

The light guide can be a rod-shaped or beam-shaped light guide, which is noticeably shorter in the direction of height and width perpendicular to its longitudinal direction than in the longitudinal direction, in particular by at least a factor of 10. This can also be described as L»H, B with L of the length of the light guide, H of the height of the light guide and B of the width of the light guide. Light guides with such a basic shape are often also referred to as rod light guides. Height H and width B of the light guide may have the same or different size or extent. It is particularly advantageous to use a rod light guide with the relationship L~10'H,B~5B,H.

The light guide can be a plate-shaped or disc-shaped light guide whose height H and width B differ significantly, i.e., that L>H>B or L>B>H applies. Height H and width B may differ, for example, by at least a factor of 2, in particular at least a factor of 5.

If the height H and the width B of the light guide are different, the longitudinal sides with the greater extent are also called flat sides, and the longitudinal sides with the smaller extent are also called narrow sides. The light input coupling surface and light deflecting surface can be provided on the narrow sides or on the flat sides.

It is a further development that the light guide has a rectangular cross-section along its longitudinal extension, resulting in a particularly effective and low-loss light emission and effective light deflection. However, the cross-section is not limited to this and can, for example, also be defined as a two-sided flattened circle, trapezoidal or freeform profile. In the event that the cross-sectional shape corresponds to that of a circle which is flattened on two sides, it may also be present in particular as a circular shape having two straight circular cuts which do not intersect. The light deflecting surface and the light output coupling surface are located on the straight circular sections. It is a further development that the circular sections are arranged parallel to each other. They may have the same length or a different length. This cross-sectional shape can also be expressed in such a way that it corresponds to a rectangular or trapezoidal basic shape with convex curved side edges, wherein the light deflecting surface and the light output coupling surface are located on the straight sides.

The cross-section may be constant in size and/or shape along the longitudinal light guide but is not limited thereto.

The light guide can extend in longitudinal extension at least partially straight and/or at least partially curved.

The light guide is in particular a transparent light guide. It can, for example, be made of plastic or glass.

The at least one light source may comprise, for example, at least one LED. The light coupled into the light guide by the at least one light source is guided in the light guide by reflection, for example total internal reflection, at the sides of the light guide in a fundamentally known manner.

The light deflection regions serve to direct light incident thereon to the light output surface under such an angle of incidence (typically low or steep) that the light is no longer reflected back into the light guide there but is exited or decoupled by the light output coupling surface.

The fact that at least one light deflection prism is optically connected downstream of the light decoupling surface comprises, in particular, that part of the light emitted from the light decoupling surface passes through the at least one light deflection prism and is thereby deflected. The light deflection prism can be a deflection prism and/or a dispersive prism. Another part of the light emitted from the light output surface runs past the at least one light deflection prism and, in particular, directly—and thus without damping—onto the area to be illuminated ("illumination area") of the vehicle interior. In particular, the surface of the at least one light deflection prism that is projected vertically onto the light output coupling surface of the light guide is smaller than the size of the light output coupling surface, so that part of the light emitted from the light output surface can pass the at least one light deflection prism.

The fact that at least one jump between two refractive indices occurs in a light path
between the light guide and the at least one light deflection prism causes a particularly effective beam deflection. This condition can also be formulated in such a way that at least one interface between materials of different refractive indices is present between the light guide and the at least one light deflection prism.

In the event that the vehicle interior lighting device has a plurality of light deflection prisms, it is designed that the light deflection prisms—in particular when looking perpendicular to the light output surface—are separately arranged on the light output surface. This results in the advantage that light which exits the light guide or passes the light deflection prisms can be emitted as useful light without attenuation between the light deflection prisms. This design comprises in particular that two light deflection prisms are not connected to each other as protruding regions of a continuous material layer, in which case the light passing between the light deflection prisms would still pass through the area of the material layer which is not protruding and thereby attenuated and/or scattered, for example due to Fresnel losses and/or reflection losses.

It is an embodiment that the light guide has a different refractive index than the at least one light deflection prism. Thus, the advantage is achieved that a particularly effective beam deflection by the prism is also achieved even if it is practically directly (optionally separated by a thin, optically practically ineffective adhesive or adhesive layer) on the light guide or even one piece is connected to the light guide. A different refractive index can be provided, for example, by different materials of light guide and prism. In a further development of the light guides and the prism, said light guides can be made of different plastic and, in a further development, of different glass. In yet another further embodiment, one of the components consists of glass, the other of plastic, and so on. The material pairs of light guide and prism may also be designed such that they have the same or different base material, wherein at least one material is provided with an additive or admixture that changes the refractive index. The plastic may be, for example, PMMA or PC.

It is an embodiment that the at least one light deflection prism is a component produced separately from the light guide. This enables a particularly robust as well as precise and easily produced device. This also facilitates the provision of light guides and prisms with different refractive indices. The contact surfaces of the light guide and prism can then lie directly on each other (for example, directly or only separated from each other by a thin, optically practically ineffective adhesive or adhesive layer).

The present disclosure is characterized in that at least one light deflection prism and the light guide form a one-piece produced multi-component component, in particular a two-component component, and the region of the component that represents the at least one light deflection prism, has a refractive index different from the area of the component that represents the light guide. Thus, the advantage of a particularly robust as well as precise and easily produced device is achieved. Such a multi-component component may, for example, be produced in the context of a multi-component injection molding process, for example, made of plastic or glass.

The present disclosure is characterized in that at least one light deflection prism is separated from the light guide by a gap. This enables effective light deflection by means of a prism even when the materials of the prism and light guide are the same. Alternatively, or additionally, a light deflection effect can be enhanced if the materials are different.

It is an embodiment that the gap is an air gap. This can be provided at a particularly low cost. A position fixation of a light deflection prism relative to the light guide can then be carried out, for example, by means of a lateral fixation, for example as a one-piece component (for example, in the form of an injection-molded component) or by means of an independent fastening device.

The gap is a gap filled with a solid material, the refractive index of which differs from the refractive index of at least the at least one light deflection prism. The advantage achieved is that a particular robust and effectively light deflecting vehicle interior lightning apparatus is provided. It is particularly advantageous for effective beam deflection if the refractive index of the material in the gap differs from the refractive index of the light guide and the at least one light deflection prism. The refractive indices of the light guide and of the at least one light deflection prism can be the same or different.

The at least one light deflection prism is arranged completely or disjunctively between the light deflection regions when viewed perpendicular to the light output coupling surface. In this way, a particularly high non-condensed useful light component, which is directly coupled out of the light guide, can be advantageously provided.

The present disclosure relates to a design having a plurality of light deflection prisms spaced apart from one another in the longitudinal direction of the light guide, wherein the light deflection prisms are each arranged between two adjacent light deflection regions when viewed perpendicular to the light output coupling surface. When viewed perpendicular to the light deflection surface of the light guide, the associated light deflection regions are not or not completely covered. In other words, they do not cover the light deflection regions completely, that is, not or only partially. When viewed perpendicular to the light output coupling surface, there always remains an area below each of the light output coupling surfaces which is not covered by the light deflection prisms.

The present disclosure is characterized in that at least one light deflection prism protrudes laterally over the light output coupling surface of the light guide at least on one side—in particular on both sides—that is, perpendicular to the longitudinal direction of the light guide. The at least one light deflection prism can, for example, have a greater width than the light guide. The advantage of this is that a particularly large amount of scattered light can be deflected into the useful light range.

The present disclosure is characterized in that a light entry surface of the at least one light deflection prism is arranged parallel to an opposite surface area of the light output coupling surface of the light guide.

The present disclosure is characterized in that the at least one light deflection region is in each case notched or triangular in the profile cross-section. The light deflection region, which is simply referred to as a "notch" in the following, can be introduced into the light deflection surface as a material recess or recess and/or can be designed as a projection projecting from the light deflection surface. The notch may be pointed or rounded, symmetrical or asymmetrical in cross-section. The notch may be a superficially continuous notch. If several notches are present, adjacent notches may have an equal or different distance from each other, at least two notches have an equal or different size, and/or at least two notches have an equal or different shape.

The aim is also achieved by a vehicle comprising at least one vehicle interior lighting apparatus as described above. The vehicle may be designed in the same way as the vehicle interior lighting apparatus and has the same advantages.

The vehicle may be a motor vehicle (for example, a motor vehicle such as a passenger car, truck, bus and so on), a railway, a watercraft (for example, a boat or a ship) or an aircraft (for example, an aircraft or a helicopter).

The present disclosure is characterized in that at least one vehicle interior lighting apparatus is designed to illuminate a door and the at least one light deflection prism is arranged in relation to the light guide in such a way that it redirects light directed from the light output coupling surface towards the door. It is a further development that the vehicle interior lighting apparatus causes in particular a glare control of the C-pillar.

BRIEF DESCRIPTION OF THE SEVERAL VIEWS OF THE DRAWINGS

Further advantages features and details of the various embodiments of this disclosure will become apparent from the ensuing description of a preferred exemplary embodiment and with the aid of the drawings. The features and combinations of features recited below in the description, as well as the features and feature combination shown after that in the drawing description or in the drawings alone, may be used not only in the particular combination recited, but also in other combinations on their own, with departing from the scope of the disclosure The following is an advantageous embodiment of the present disclosure which is schematically explained in more detail with reference to the accompanying figures. wherein.

DETAILED DESCRIPTION OF THE INVENTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of "A, B, and C" should be understood as including only one of A, only one of B, only one of C, or any combination of A, B, and C.

Figure 1:
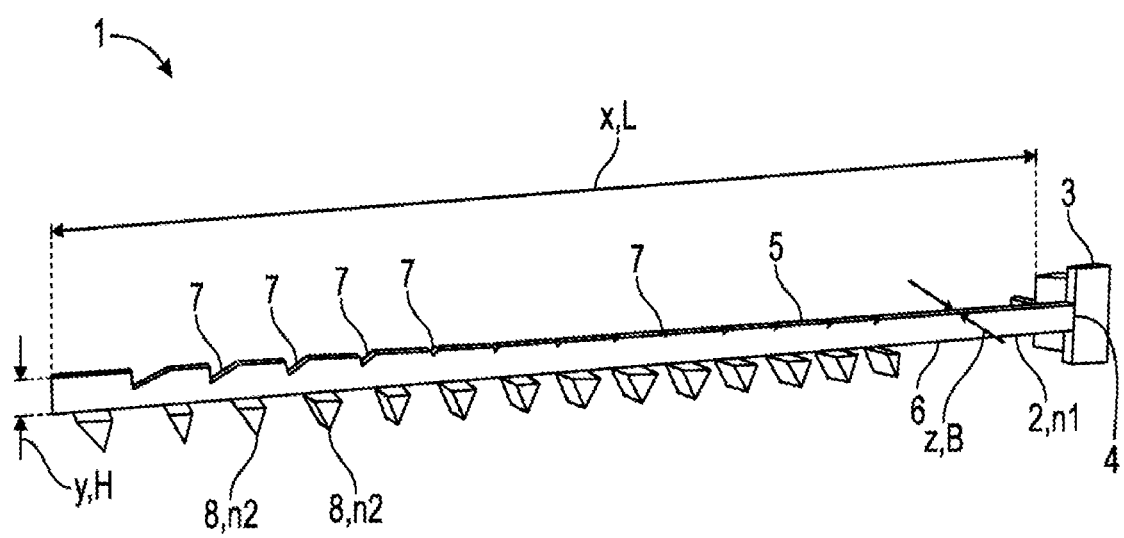
FIG. 1 depicts, in an oblique view, a vehicle interior lighting apparatus according to the present disclosure.

FIG. 1 depicts an oblique view of a vehicle interior lightning apparatus 1, which has an elongated light guide 2 made of a transparent material with a refractive index n1, for example made of plastic such as PC or PMMA.

The light guide 2 is designed as a profiled body extending rectilinearly along its longitudinal direction x with length L and with a rectangular, constant cross-sectional shape. In the height direction y perpendicular to the longitudinal direction x, it has a height H, and in the width direction z perpendicular to the longitudinal direction x and to the height direction y, it has a width B, where L>>H and L>>B, in particular L~10H and L~10B. The light guide 2 can thus also be referred to as a rod light guide. Furthermore, purely by way of example, H>B applies, in particular H~2B, especially H~5B. The light guide 2 is therefore noticeably higher than it is wide.

The vehicle interior lighting apparatus 1 further comprises at least one light source 3, for example in the form of at least one LED, the light of which can be coupled into one of the two end faces. This end face thus provides or represents a front-side light input coupling surface 4. The parallel narrow sides of the light guide 2 with the surfaces L B provide or represent a longitudinal light deflection surface 5 in relation to a longitudinal light output coupling surface 6 and are thus opposite each other. Light emitted by the light source 3 through the light input coupling surface 4 into the light guide 2 is guided in this generally known manner, for example by total reflection.

A plurality of light deflection regions arranged in series along the longitudinal direction x and spaced apart from one another are introduced on the light deflection surface 5 in the form of notches 7. The notches 7 have here, for example, a different size and shape depending on the light input coupling surface 4 in order to achieve a uniform decoupling of useful light over the longitudinal direction x. A shape of the notches can also vary. All notches 7 are here exemplary formed consistently in width direction z.

If light guided in the light guide 2 hits one of the notches 7, it is redirected by the latter to the light output coupling surface 6 in such a way that the angle of incidence there allows an extraction from the light output coupling surface 6.

Several light deflection prisms 8 arranged in series in the longitudinal direction x are arranged opposite the light output coupling surface 6 optically behind the light output coupling surface 6 and at a distance therefrom. The light deflection prisms 8 are arranged separately from one another on the light output coupling surface and are not connected to one another with respect to the light output coupling surface 6, for example, via a common carrier film or similar. However, they can be connected to each other outside a light path, for example in the form of a single light path. component produced in one piece. The light deflection prisms 8 are designed as profile bodies extending in a straight line in the direction of width z, each having in particular a constant size and/or shape of the cross-section but are generally not limited to this. The cross-section is an example of a triangular cross-section.

The light deflection prisms 8 have in particular been produced separately from the light guide 2. Compared to the light guide 2, they may consist of a material having a refractive index n2 which is the same or different from the refractive index n1 of the light guide n2, for example made of plastic or glass. The light deflecting prisms 8 here exemplarily have a different size, shape and/or orientation depending on the light input coupling surface 4.

Figure 2:
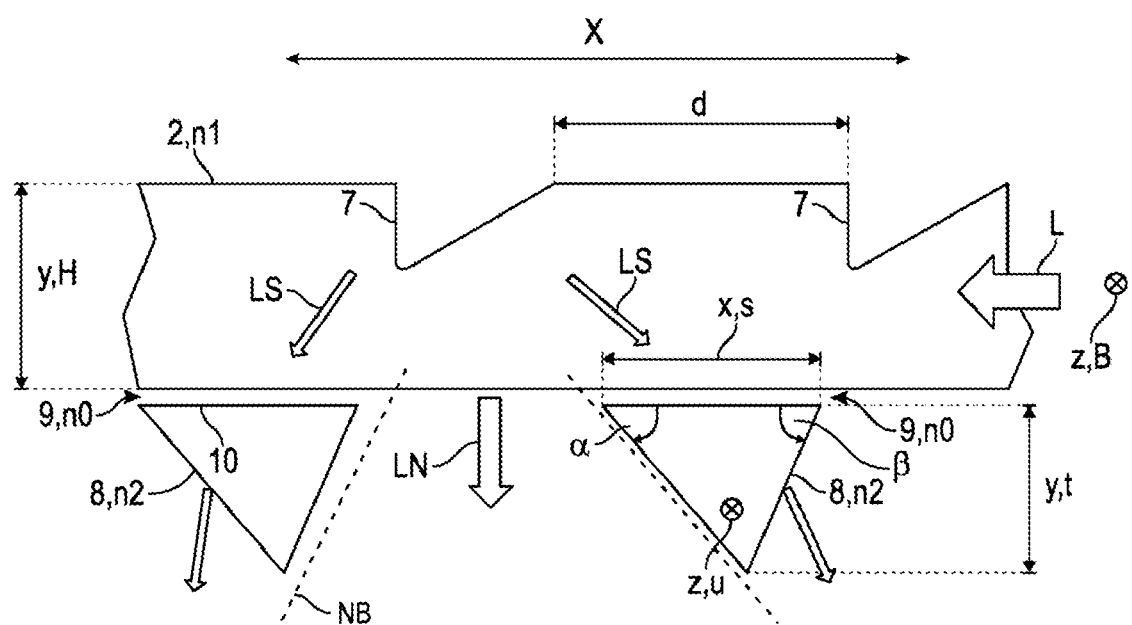
FIG. 2 depicts, as a sectional view, a simplified sketch of a section of the vehicle interior lighting apparatus from FIG. 1.

FIG. 2 depicts a simplified sketch of a section of the vehicle interior lightning apparatus 1 in the region of a longitudinal section of the light guide 2 having two equal notches 7 and two equal light deflection prisms 8. The light deflection prisms 8 have a length s, a height t and a width u.

In particular, the light deflection prisms 8 protrude laterally on both sides (that is, in the direction of width z) beyond the light output coupling surface 6 of the light guide 2, in relation to the latter. So u>B applies. This advantageously results in particularly reliable glare control.

The notches 7 are spaced apart from each other in the longitudinal extension or longitudinal direction x with an edge-to-edge distance d. When viewed, the light deflection prisms 8 are arranged perpendicular to the light output coupling surface 6 or in relation to their position along the longitudinal direction x between the notches 7.

The light deflection prisms 8 are also arranged at a distance from the light guide 2 by a respective air gap 9. As a result, at least one jump between two refractive indices occurs in a respective light path between the light guide 2 and the light deflection prisms 8, namely here at the light output coupling surface 6 of the light guide 2 to the air gap 9 and at the light entry surface 10 of the respective light deflection prism 10. It is assumed that the refractive indices n1 and n2 differ from the refractive index n0 of air, in particular are greater.

The light L deflected by the notches 7 is predominantly decoupled from the light output coupling surface 6 in an area opposite the notches 7, namely as useful light LN, which passes between the light deflection prisms 8 without being influenced by them. This useful light range NB corresponds here to a solid angle range of approximately ±50° to the perpendicular of the light output coupling surface 6.

However, starting from the notches 7, also ("scattered light"-) component LS of the light L also strike the light output coupling surface 6 at such a flat angle that they subsequently strike the light deflection prisms 8 and are at least partially deflected by them into the useful light region NB. This is particularly advantageous since it not only avoids disturbing, in particular potentially blinding, scattered light LS, but is also used to amplify the useful light LN.

The light deflection prisms 8 are advantageously shaped and arranged in such a way that at least one of the following conditions is fulfilled for the particularly effective light deflection and for achieving a high light yield:

The light entry surface 10 is parallel or tangential to the opposite region of the light output coupling surface 6;

The length s of a light deflection prism 8 is less than the distance d of two adjacent notches 7, in particular two diagonally opposite adjacent notches 7;

Corners—and—of the light entry surface 10 to the other surfaces of light deflection prisms 8 are each smaller than 90°;

The height of the light deflection prisms 8 is between 1 mm and 10 mm.

At least one such condition may also be considered generally advantageous. The angles—and—may have an equal or different size.

Figure 3:
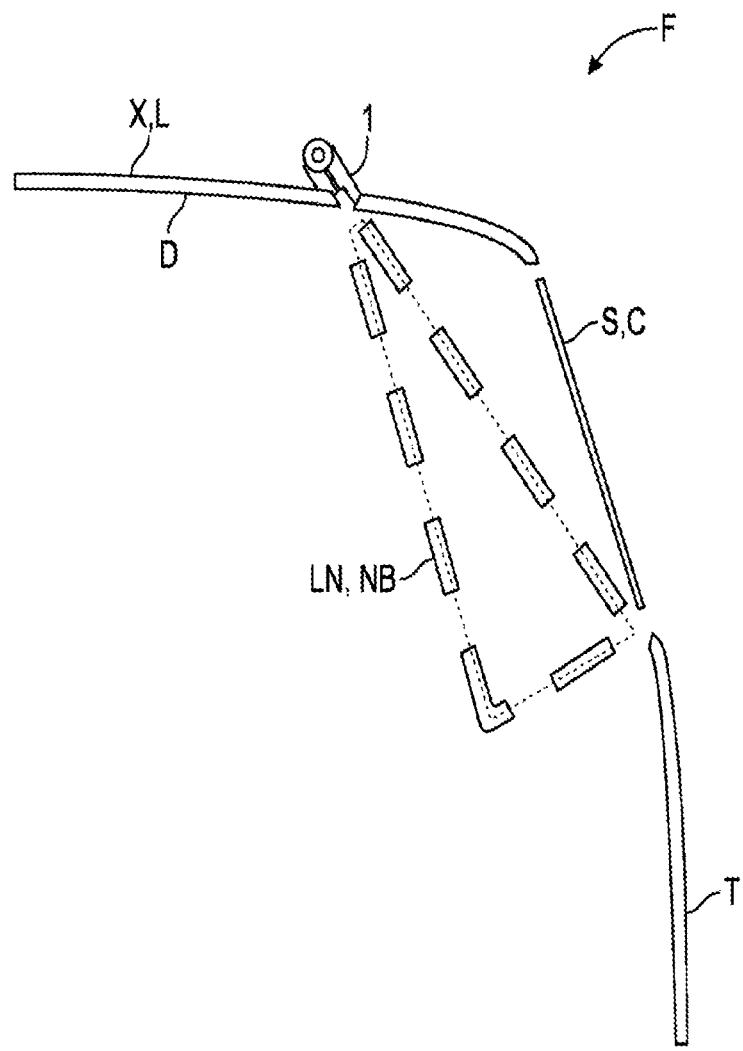
FIG. 3 depicts a section of a vehicle with the vehicle interior lighting apparatus from FIG. 1 as a section in front view.

FIG. 3 depicts a sectional view from the front of a vehicle F with at least one vehicle interior lighting apparatus 1 for illuminating a door T of the vehicle F. The vehicle interior lighting apparatus 1 is accommodated in a housing in the region of a headliner D. The associated or useful light region NB is directed to an inner side of the door T below a door pane S as the illumination area.

Figure 4:
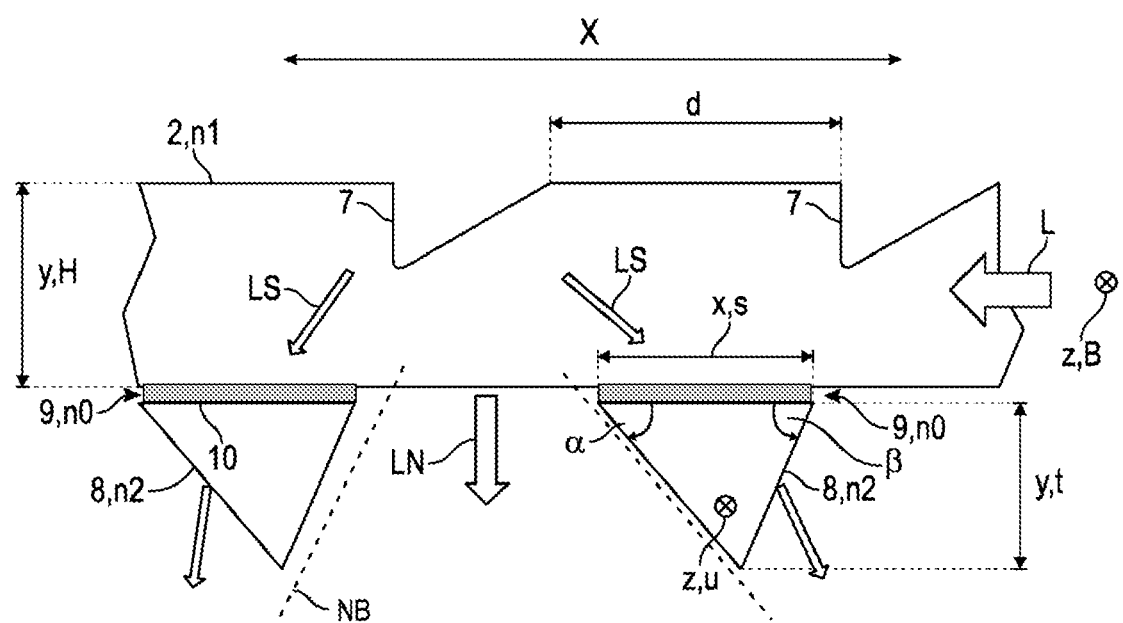
FIG. 4 depicts the gap filled with solid material.

FIG. 4 depicts antoher view of the present invention as depicted for example in FIG. 2. In FIG. 4 the gap 9 is depicted including a solid material used in the gap, the solid material being depicted by way of a greyed-out portion of the gap 9.

The light deflection prisms 8 are arranged with respect to the light guide 2 in such a way that they deflect scattered light LS from the light output coupling surface 6 in the direction next to the door T—for example in the direction of a C-pillar C, which is located here behind a door pane S—onto the door T. Thus, the advantage is achieved that a vehicle occupant is not blinded by the vehicle interior lighting apparatus 1 when he leans his head against the C-pillar C for relaxation. It has been shown experimentally that otherwise interfering scattered light LS incident on the C-pillar C can be reduced by 90% to 95% in relation to its intensity by providing light deflection prisms 8.

In principle, one or more vehicle interior lighting apparatus 1 can be used to illuminate an area of a vehicle interior or interior.

The figures are merely schematic representations and serve only to explain the present disclosure. Identical elements or similar are consistently provided with the same reference signs.

Although the vehicle interior lighting apparatus 1 has been described in FIG. 1 and FIG. 2 on the basis of light deflection prisms 8 with a triangular cross-section, the cross-sectional shape may generally differ from this, for example, it may be trapezoidal. The above advantageous conditions for light deflection prisms 8 with a triangular cross-section can then also apply, for example, to light deflection prisms with a trapezoidal cross-section.

The use of the vehicle interior lighting apparatus is not limited to the examined door lighting, but can be used for all possible lighting tasks, in particular for indirect lighting tasks, in the vehicle interior.

In general, the radiation direction and the opening angle of the useful light range can be adapted to a desired application purpose by suitable selection of the number, arrangement, shape and size of the light deflection prisms, for different application purposes if necessary, possible using the same combination of light source and light guide, which allows a particularly flexible and cost-effective design of the vehicle interior lighting apparatus.

Having described some aspects of the present disclosure in detail, it will be apparent that further modifications and variations are possible without departing from the scope of the disclosure. All matter contained in the above description and shown in the accompanying drawings shall be interpreted as illustrative and not in a limiting sense.

The invention claimed is:

1. A vehicle interior lighting apparatus, comprising:
an elongated light guide comprising at least one front side light input coupling surface, a longitudinal light deflection surface and a longitudinal side opposite the light deflection surface opposite a light output coupling surface wherein at the light deflection surface several light deflection regions are arranged spaced apart from one another in a longitudinal direction of the light guide, and light from the at least one light source enters the light guide through the at least one light input coupling surface and is decoupled from the light guide by means of light deflection at the light deflection surface and exits the light output coupling surface,
wherein at least one light deflection prism of the light output coupling surface is connected downstream,
wherein at least one jump between two refractive indices occurs in a light path between the light guide,
wherein the at least one light deflection prism, is arranged between two adjacent light deflection regions when viewed perpendicular to the light output coupling surface, wherein the at least one light deflection prism when viewed from a perspective perpendicular to the light output coupling surface is arranged between the light deflection regions, and wherein downstream indicates the direction of the light flow.

2. The vehicle interior lighting apparatus according to claim 1, further comprising a plurality of light deflection prisms arranged separately from each other on the light output coupling surface.

3. The vehicle interior lighting apparatus according to claim 1, wherein the light guide comprises a different refractive index than the at least one light deflection prism.

4. The vehicle interior lighting apparatus according to claim 1, wherein at least one light deflection prism is a component separate from the light guide, comprises different refractive index than the light guide, and rests directly on the light guide.

5. The vehicle interior lighting apparatus according to claim 1, wherein at least one light deflection prism and the light guide form a component arranged as one element and further comprising the at least one light deflection prism that has a different refractive index than the light guide.

6. The vehicle interior lighting apparatus according to claim 1, wherein at least one light deflection prism is spaced from the light guide by a gap.

7. The vehicle interior lighting apparatus according to claim 6, wherein the gap is an air gap.

8. The vehicle interior lighting apparatus according to claim 6, wherein the gap is filled with a solid material having refractive index that is different from a refractive index of at least the at least one light deflection prism differentiated and wherein solid material refers to the aggregate state of the material.

9. The vehicle interior lighting apparatus according to claim 1, further comprising a plurality of light deflection prisms spaced apart from one another in the longitudinal direction of the light guide, the light deflection prisms each being arranged between two adjacent light deflection regions when viewed perpendicular to the light output coupling surface.

10. The vehicle interior lighting apparatus according to claim 1, wherein at least one light deflection prism protrudes laterally at least on one side beyond the light output coupling surface of the light guide.

11. A vehicle comprising:
at least one vehicle interior lighting apparatus comprising an elongated light guide comprising at least one front side light input coupling surface, a longitudinal light deflection surface and a longitudinal side opposite the light deflection surface opposite a light output coupling surface wherein at the light deflection surface several light deflection regions are arranged spaced apart from one another in a longitudinal direction of the light guide, and light from the at least one light source enters the light guide through the at least one light input coupling surface and is decoupled from the light guide by means of light deflection at the light deflection surface and exits the light output coupling surface, wherein at least one light deflection prism of the light output coupling surface is connected downstream, wherein at least one jump between two refractive indices occurs in a light path between the light guide, wherein the at least one light deflection prism is arranged between two adjacent light deflection regions when viewed perpendicular to the light output coupling surface, wherein the at least one light deflection prism from a perspective perpendicular to the light output coupling surface is arranged between the light deflection regions, and wherein downstream indicates the direction of the light flow.

12. The vehicle according to claim 11, wherein at least one vehicle interior lighting apparatus is set up for illuminating a door and the at least one light deflection prism is arranged in relation to the light guide such that it scatters light directed from the light output coupling surface in the direction next to at least one of a useful light area and next to a door onto the useful light area.

* * * * *